United States Patent [19]

Jang

[11] Patent Number: 5,748,830
[45] Date of Patent: May 5, 1998

[54] COLOR SIGNAL PROCESSOR FOR REMOVING LEAKAGE COMPONENTS

[75] Inventor: Soon-mo Jang, Suwon, Rep. of Korea

[73] Assignee: Samsung Electronics Co., Ltd., Kyungki-do, Rep. of Korea

[21] Appl. No.: 676,640

[22] Filed: Jul. 10, 1996

[30] Foreign Application Priority Data

Jul. 10, 1995 [KR] Rep. of Korea ................ 1995 20204

[51] Int. Cl.$^6$ ............................................. H04N 17/00
[52] U.S. Cl. ............................................. 386/22; 348/609
[58] Field of Search ............................ 386/13, 21, 22, 386/24, 25, 28, 41, 114, 113, 26; 348/609, 610, 663, 665, 608, 607; 455/295

[56] References Cited

U.S. PATENT DOCUMENTS

| 3,872,498 | 3/1975 | Pritchard | 386/25 |
|---|---|---|---|
| 4,178,606 | 12/1979 | Hirota | 386/24 |
| 4,200,881 | 4/1980 | Carnt et al. | 348/665 |
| 4,218,696 | 8/1980 | Ushio et al. | 386/25 |
| 4,344,082 | 8/1982 | Ishiodori | 386/25 |
| 4,597,021 | 6/1986 | Yamamitsu et al. | 386/22 |
| 4,809,085 | 2/1989 | Funahashi | 386/22 |
| 5,010,416 | 4/1991 | Yasumura et al. | 386/26 |
| 5,016,111 | 5/1991 | Sakamoto et al. | 386/25 |
| 5,500,739 | 3/1996 | Strolle et al. | 386/25 |
| 5,526,126 | 6/1996 | Furihata et al. | 386/22 |

*Primary Examiner*—Andrew Faile
*Assistant Examiner*—Aung S. Moe
*Attorney, Agent, or Firm*—Sughrue, Mion, Zinn, Macpeak & Seas, PLLC

[57] ABSTRACT

A color signal processor is provided for removing a leakage component from a harmonic wave of a color signal, which causes crosstalk on a screen when a video signal is reproduced from or recorded on a recording medium. To remove the leakage component of the color signal an additional main converter having the same function as that of an existing main converter, a 1H delay and a subtracter are added to a conventional color signal processor. A 180° phase-inverted signal, generated by delaying a signal in the 1H delay, is subtracted from the signal output from the existing main converter, thereby outputting a pure color signal which does not include a leakage component due to the harmonic wave, thereby providing an excellent quality picture.

6 Claims, 4 Drawing Sheets

COLOR SIGNAL PROCESSOR FOR REMOVING LEAKAGE COMPONENTS

BACKGROUND OF THE INVENTION

1. Field of the Invention

The present invention relates to a color signal processor for removing a leakage component of a color signal which causes crosstalk on a screen when a video signal is reproduced from or recorded on a recording medium, to provide excellent picture quality.

2. Description of the Related Art

When a video signal is recorded, a color signal of the video signal is processed by low-pass filtering it and mixing the low-pass filtered signal with a luminance signal Y. When the video signal is reproduced from a recording medium, a color signal is processed by separating the color signal from a video signal picked up from the recording medium and converting the separated color signal into an original color signal. Crosstalk can appear on a screen due to a leakage component of a harmonic wave generated from a converter during color signal processing, when the color signal is recorded on or reproduced from the recording medium. Since a conventional color signal processor has no function for removing such a harmonic wave component, crosstalk will occur on the screen.

FIG. 1 is a block diagram of a conventional color signal processor for reproducing a video signal.

In FIG. 1, a video signal picked up from a recording medium is applied to a low-pass filter (LPF) 11. The video signal is filtered by LPF 11 to remove a luminance signal Y. The color signal obtained by filtering the video signal in LPF 11 is output to an automatic color gain controller (ACC) 12. ACC 12 automatically controls a gain-difference between a first-channel color signal and a second-channel color signal. The color signal is output from ACC 12 to a burst de-emphasis unit 13. The burst de-emphasis unit 13 de-emphasizes a portion of the signal emphasized during recording. The de-emphasized signal is output to a main converter 14. Meanwhile, an auxiliary converter 17 receives a 629 kHz signal output from an automatic frequency controller (AFC) (not shown) and a 3.579545 MHz signal output from an automatic phase controller (APC) (not shown), and outputs a 4.208545 MHz signal (i.e., 3.579545 MHz+629 KHz) to a first band-pass filter (BPF) 16. The 4.208545 MHz signal is band-pass filtered by first BPF 16, and the band-pass filtered signal is input to main converter 14 as a reference signal.

Main converter 14 receives the 629 KHz signal output from burst de-emphasis unit 13 and the 4.208545 MHz signal output from first BPF 16, and outputs a 3.579545 MHz signal (i.e., 4.208645 MHz–629 KHz) to a second BPF 15. Second BPF 15 band-pass filters a color signal having a frequency of 3.58 MHz and outputs the filtered signal to an adder 18. Adder 18 adds the input 3.58 MHz color signal and a luminance signal Y and outputs a video signal.

FIG. 2 is a block diagram of a conventional color signal processor for recording a video signal.

The video signal to be recorded is input to a second BPF 21, which extracts a color signal having a color subcarrier, which has a frequency of 3.579545 MHz. The extracted color signal is input to an ACC 22, which controls a gain-difference between a first-channel color signal and a second-channel color signal. A burst emphasis unit 23 emphasizes a burst signal included in a color signal and outputs the emphasized signal to a main converter 24.

Meanwhile, an auxiliary converter 27 receives a 629 KHz signal output from an automatic frequency controller (AFC) (not shown) and a 3.579545 MHz signal output from an automatic phase controller (APC) (not shown), and outputs a signal having a frequency of 4.208545 MHz (i.e., 3.579545 MHz+629 KHz) to a first band-pass filter (BPF) 26. The 4.208545 MHz signal is band-pass filtered in the first BPF. The band-pass filtered signal is input to main converter 24 as a reference signal.

Main converter 24 receives the 3.579545 MHz signal output from burst emphasis unit 23 and the 4.208545 MHz signal output from first BPF 26, and outputs a signal having a frequency of 629 kHz (i.e., 4.208645 MHz–3.579545 MHz) to a LPF 25. The LPF 25 low-pass filters the 629 kHz color signal and outputs the filtered signal to an adder 28. Adder 28 adds the input 629 KHz color signal and a luminance signal Y signal to output a video signal to be recorded on the recording medium.

The above-described conventional color signal processor can generate a leakage component due to a harmonic wave when performing conversion operations in the auxiliary converter and the main converter when recording and reproducing the video signal. For example, when reproducing a video signal, leakage components of 2.95 MHz and 5.47 MHz (i.e., 4.21 MHz±(0.629 MHz×2)) according to a second harmonic wave having a frequency of 0.629 MHz, are generated in the main converter. Such leakage components cause crosstalk to lower the quality of a displayed picture.

SUMMARY OF THE INVENTION

To solve the above problem, it is an object of the present invention to provide a color signal processor, when reproducing and recording a video signal, by removing a leakage component due to a harmonic wave causing crosstalk on a screen, to thereby provide an excellent quality picture.

To accomplish the above object of the present invention, there is provided a color signal processor for reproducing a video signal picked up from a recording medium, without generating a leakage component due to a harmonic wave, in which a color signal is separated from the video signal and is modulated by a reference signal to thereby generate a modulated signal corresponding to an original color signal, said color signal processor for reproducing the video signal comprising:

a one-horizontal line (1H) delay for delaying the modulated signal according to the reference signal by 1H thereby inverting the phase of the delayed signal by 180° and outputting a delayed signal; and a subtracter for subtracting the delayed signal from the modulated signal thereby generating a pure color signal which does not include a leakage component due to a harmonic wave.

The color signal processor for reproducing can further comprise a main converter for modulating the color signal according to the reference signal thereby generating the modulated signal, and outputting the modulated signal to said subtracter and said 1H delay.

There is also provided a color signal processor for recording a video signal on a recording medium in which a color signal of the video signal to be recorded is modulated based on a reference signal thereby generating a modulated signal, and the modulated signal is mixed with a luminance signal to thereby be recorded on the recording medium, said color signal processor comprising:

a one-horizontal line (1H) delay for delaying by 1H the modulated signal thereby inverting the phase of the delayed signal by 180° and outputting a delayed signal; and a subtracter for subtracting the delayed signal from the modulated signal thereby generating a pure color signal which does not include a leakage component due to a harmonic wave.

The color signal processor for recording can further comprise a main converter for modulating the color signal according to the reference signal thereby generating the modulated signal, and outputting the modulated signal to said subtracter and said 1H delay.

BRIEF DESCRIPTION OF THE DRAWINGS

The preferred embodiments are described with reference to the drawings, wherein.

DETAILED DESCRIPTION OF THE PREFERRED EMBODIMENT

A preferred embodiment of the present invention is described below in more detail with reference to FIGS. 3 and 4.

Figure 1:
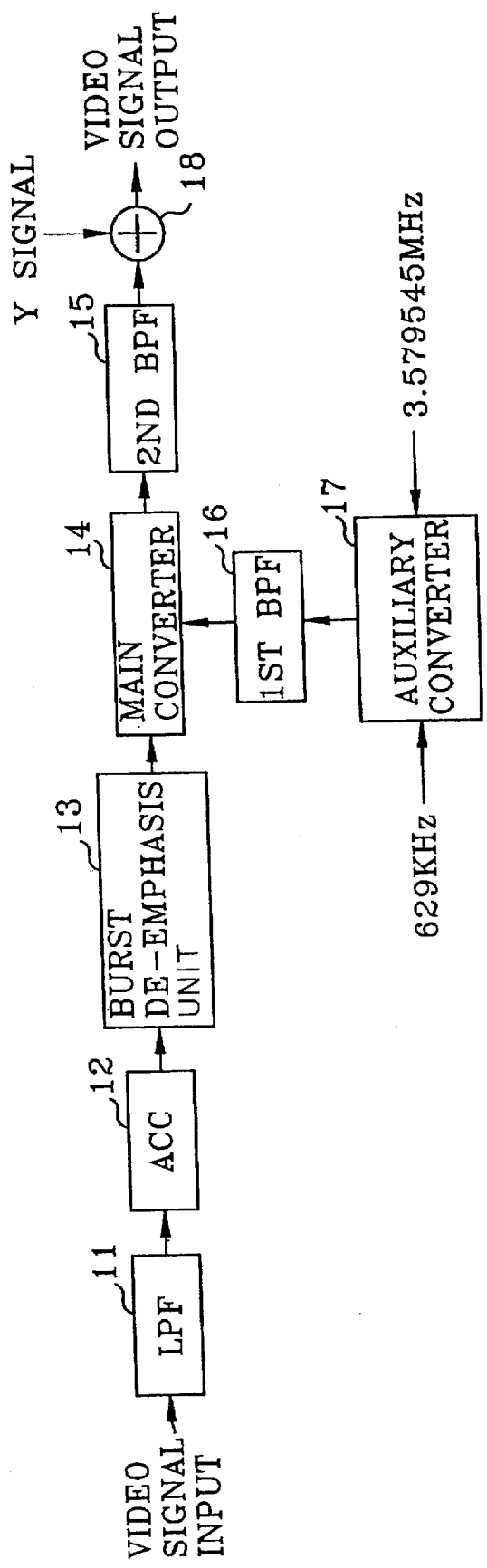
FIG. 1 is a block diagram of a conventional color signal processor for reproducing a video signal from a recording medium.
Figure 2:
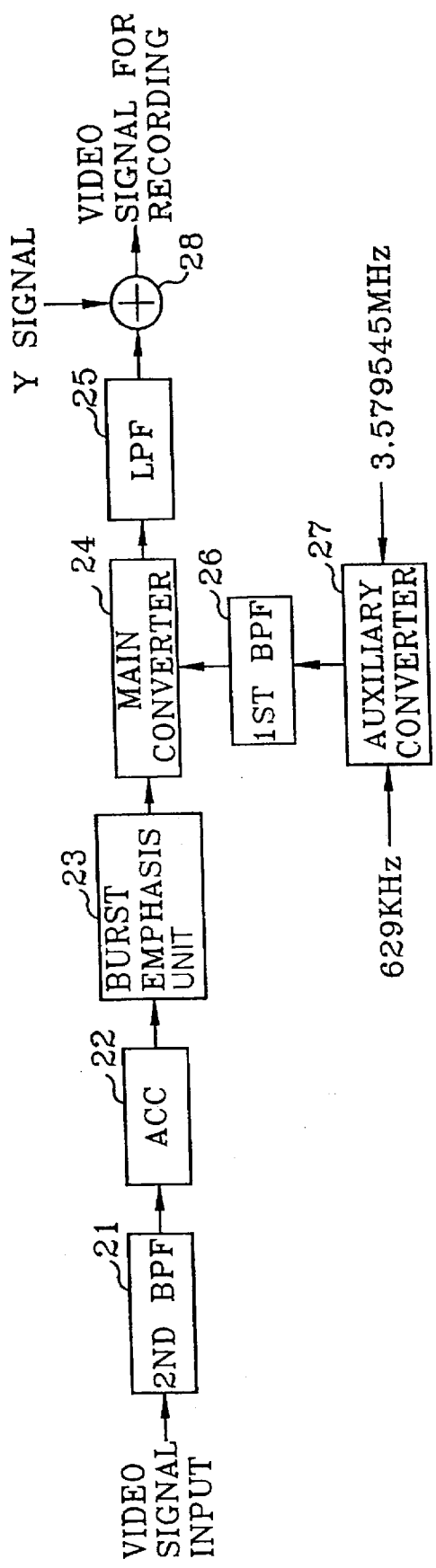
FIG. 2 is a block diagram of a conventional color signal processor for recording a video signal on a recording medium.
Figure 3:
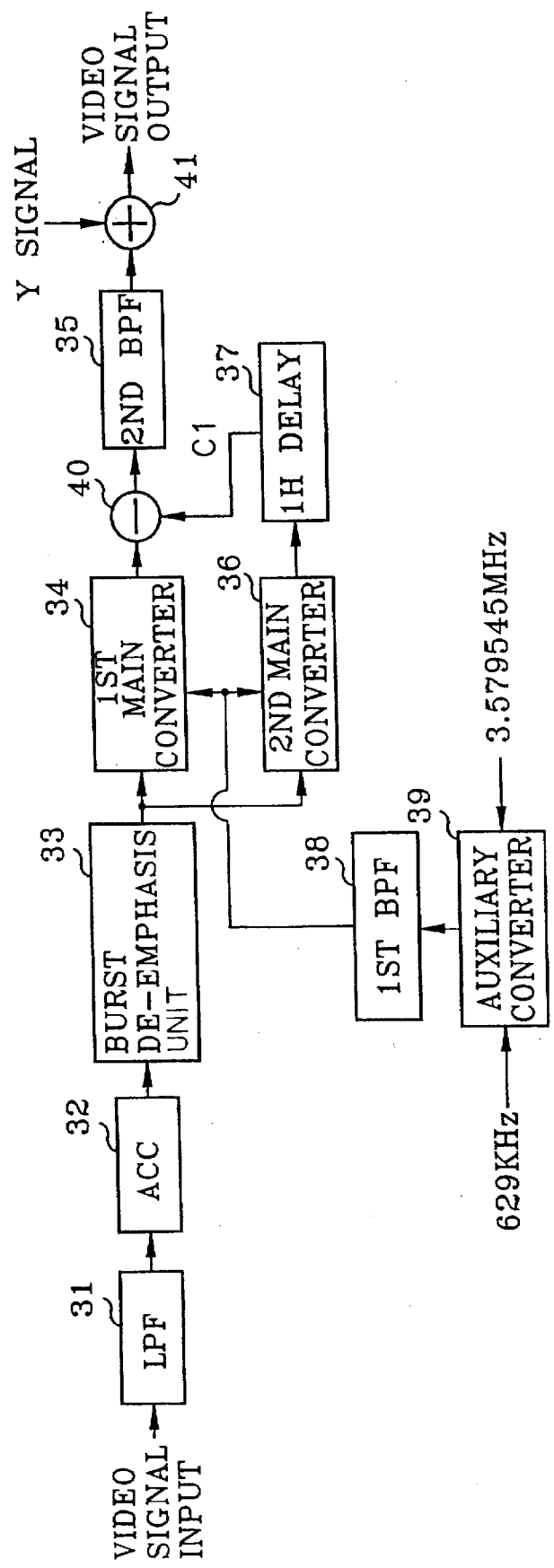
FIG. 3 is a block diagram of a color signal processor for reproducing a video signal according to the present invention.

FIG. 3 shows a color signal processor for reproducing a video signal, in which a video signal picked up from a recording medium (not shown) is applied to a low-pass filter (LPF) 31. The video signal is filtered by LPF 31 to remove a luminance signal Y. A color signal obtained by filtering the video signal in LPF 31 is output to an automatic color gain controller (ACC) 32, which automatically controls a gain-difference between a first-channel color signal and a second-channel color signal. The color signal is output to a burst de-emphasis unit 33, which de-emphasizes the portion of the signal emphasized during recording, from the gain-difference controlled color signal. The de-emphasized signal is output to a first main converter 34 and a second main converter 36.

Meanwhile, an auxiliary converter 39 receives a 629 KHz signal output from an automatic frequency controller (AFC) (not shown) and a 3.579545 MHz signal output from an automatic phase controller (APC) (not shown), and outputs a signal having a frequency of 4.208545 MHz (i.e., 3.579545 MHz+629 KHz) to a first band-pass filter (BPF) 38. The 4.208545 MHz signal is band-pass filtered by the first BPF 38 which outputs a band-pass filtered signal to the first and second main converters 34 and 36 as a reference signal.

The first and second main converters 34 and 36 receive the 629 KHz signal output from burst de-emphasis unit 33 and the 4.208545 MHz signal output from first BPF 38, and output a signal having a frequency of 3.579545 MHz (i.e., 4.208645 MHz–629 KHz). In this case, leakage components such as signals having frequencies of 2.95 MHz and 5.47 MHz, which are due to a second harmonic wave, can be generated. In the present invention as shown in FIG. 3, the output from the first main converter 34 is directly input to a subtracter 40, and the output from the second main converter 36 is delayed in a 1H delay 37 and then is input to subtracter 40. The subtracter 40 subtracts a 180° phase inverted signal, which is delayed in 1H delay 37, from the signal output from first main converter 34, to output a pure color signal having a frequency of 3.58 MHz. Thus, the color signal output from subtracter 40 does not include a leakage component from a harmonic wave. The color signal output from subtracter 40, which does not include a leakage component, is input to a second BPF 35. The second BPF 35 band-pass filters the 3.58 MHz color signal and outputs the filtered signal to an adder 41. The adder 41 adds the input 3.58 MHz color signal and a luminance signal Y to output a video signal.

Figure 4:
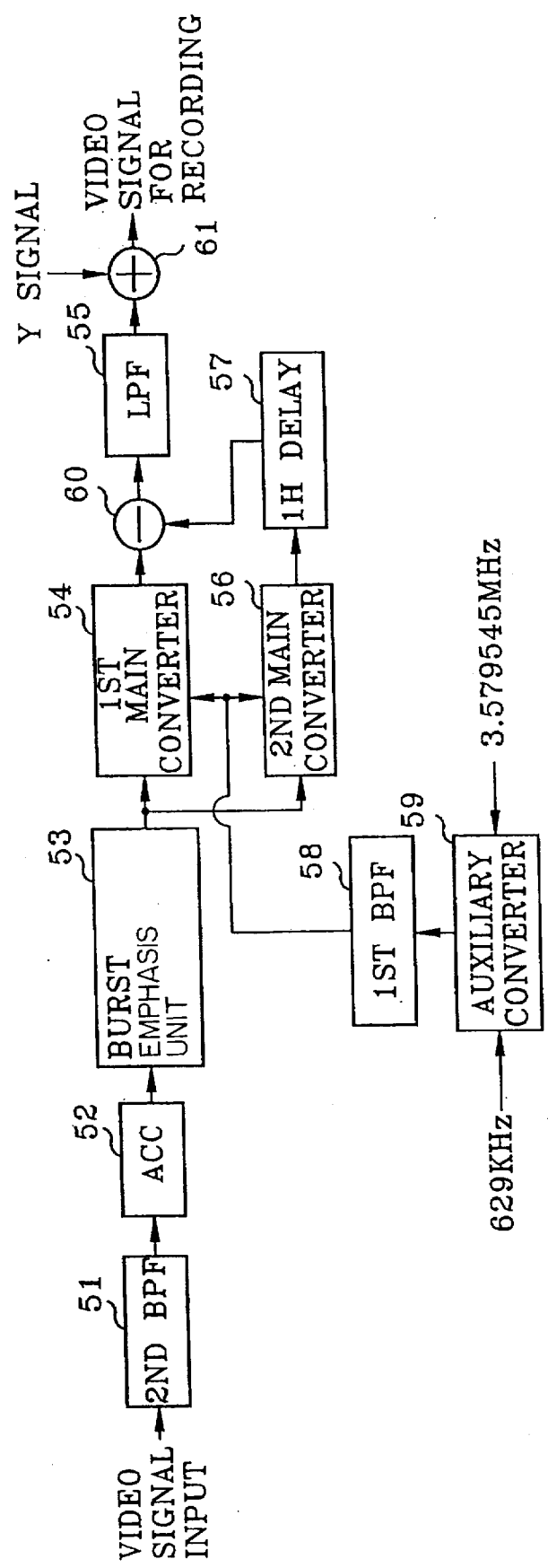
FIG. 4 is a block diagram of a color signal processor for recording a video signal according to the present invention.

FIG. 4 is a block diagram of a color signal processor for recording a video signal.

The video signal to be recorded is input to a second BPF 51, which extracts a color signal having a color subcarrier of 3.579545 MHz. The extracted color signal is input to an ACC 52, which controls a gain-difference between a first-channel color signal and a second-channel color signal, and outputs the gain-difference controlled color signal to a burst emphasis unit 53. The burst emphasis unit 53 emphasizes a burst signal included in the color signal and outputs the emphasized signal to first and second main converters 54 and 56.

Meanwhile, an auxiliary converter 59 receives a 629 KHz signal output from an automatic frequency controller (AFC) (not shown) and a 3.579545 MHz signal output from an automatic phase controller (APC) (not shown), and outputs a signal having a frequency of 4.208545 MHz (i.e., 3.579545 MHz+629 KHz) to a first band-pass filter (BPF) 58. The 4.208545 MHz signal is band-pass filtered by the first BPF 58. The band-pass filtered signal is input to first and second main converters 54 and 56 as a reference signal.

First and second main converters 54 and 56 receive the 3.579545 MHz signal output from burst de-emphasis unit 53 and the 4.208545 MHz signal output from first BPF 58, and outputs a signal having a frequency of 629 kHz (i.e., 4.208645 MHz–3.579545 MHz). The signal output from first main converter 54 is directly input to a subtracter 60, and the output from second main converter 56 is delayed by 1H in a 1H delay 57 before being input to subtracter 60. Subtracter 60 subtracts a 180° phase inverted signal, corresponding to the 1H delayed signal from 1H delay 57, from the signal output from first main converter 54, to output a pure color signal having a frequency of 629 kHz which does not include a leakage component due to a harmonic wave. The color signal output from subtracter 60, which does not include the leakage component, is input to a LPF 55. The LPF 55 low-pass filters a color signal having a frequency of 629 KHz and outputs the filtered signal to an adder 61. The adder 61 adds the input 629 KHz color signal and a luminance signal Y signal to output a video signal which is to be recorded on a recording medium.

The embodiment of the present invention shown in FIG. 3 includes separate first and second main converters. However, a person of ordinary skill in this field may substitute the first main converter and the second main converter with a single main converter having same functions. Therefore the embodiment of the present invention shown in FIG. 3 is not intended to limit the scope of the invention.

As described above, the present invention includes an additional main converter having the same function as that of an existing main converter, a 1H delay and a subtracter over that of a conventional color signal processor, which subtracts a signal delayed in the 1H delay, thereby generating a 180° phase-inverted signal, from the signal output from the existing main converter, to output a pure color signal which does not include a leakage component due to a harmonic wave, to thereby provide an excellent quality picture.

While only certain embodiments of the invention have been specifically described herein, it will be apparent that numerous modifications may be made thereto without departing from the spirit and scope of the invention.

What is claimed is:

1. A color signal processor for reproducing a video signal picked up from a recording medium, without generating a leakage component due to a harmonic wave, in which a color signal is separated from the video signal and is frequency converted according to a reference signal to thereby generate a frequency converted signal corresponding to an original color signal, said color signal processor for reproducing the video signal comprising:

a one-horizontal line (1H) delay for delaying the frequency converted signal according to the reference signal by 1H thereby inverting the phase of the delayed signal by 180° and outputting a delayed signal;

a subtracter for subtracting the delayed signal from the frequency converted signal thereby generating a pure color signal which does not include a leakage component due to a harmonic waves; and a main converter for frequency converting the color signal according to the reference signal thereby generating the frequency converted signal, and outputting the frequency converted signal to said subtracter and said 1H delay, said main converter comprising:

a first main converter for frequency converting the color signal according to the reference signal and outputting a first frequency converted signal to said subtracter; and a second main converter for frequency converting the color signal according to the reference signal and outputting a second frequency converted signal to said 1H delay.

2. The color signal processor according to claim 1, wherein the pure color signal has a frequency of 3.58 MHz.

3. The color signal processor according to claim 1, further comprising:

an adder for combining the pure color signal with a luminance signal and outputting a video signal corresponding to the video signal recorded on the recording medium; and means for reproducing the video signal output from said adder, wherein the reproduced video signal does not include a crosstalk signal.

4. A color signal processor for recording a video signal on a recording medium in which a color signal of the video signal to be recorded is frequency converted based on a reference signal thereby generating a frequency converted signal, and the frequency converted signal is mixed with a luminance signal to thereby be recorded on the recording medium, said color signal processor comprising:

a one-horizontal line (1H) delay for delaying by 1H the frequency converted signal thereby inverting the phase of the delayed signal by 180° and outputting a delayed signal;

a subtracter for subtracting the delayed signal from the frequency converted signal thereby generating a pure color signal which does not include a leakage component due to a harmonic wave; and a main converter for frequency converting the color signal according to the reference signal thereby generating the frequency converted signal, and outputting the frequency converted signal to said subtracter and said 1H delay said main converter comprising:

a first main converter for frequency converting the color signal according to the reference signal and outputting a first frequency converted signal to said subtracter; and a second main converter for frequency converting the color signal according to the reference signal and outputting a second frequency converted signal to said 1H delay.

5. The color signal processor according to claim 4, wherein the pure color signal has a frequency of 629 kHz.

6. The color signal processor according to claim 4, further comprising:

an adder for combining the pure color signal with a luminance signal and outputting a video signal corresponding to the video signal; and means for recording the video signal output from said adder, wherein the recorded video signal does not include a crosstalk signal.

* * * * *